Feb. 7, 1939.  V. J. ROPER  2,146,593
VEHICLE HEAD LAMP
Filed Nov. 18, 1931  4 Sheets-Sheet 1
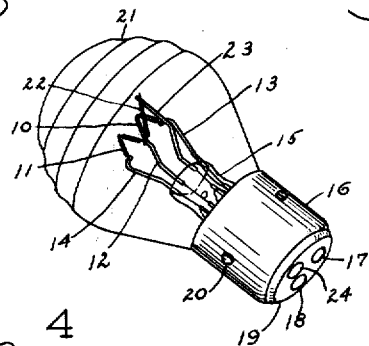
Fig 1
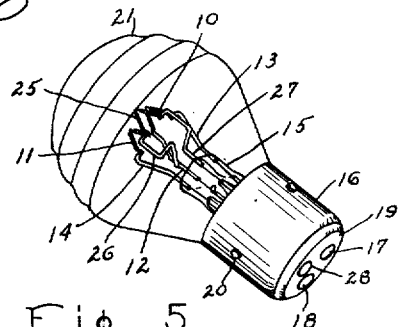
Fig 2
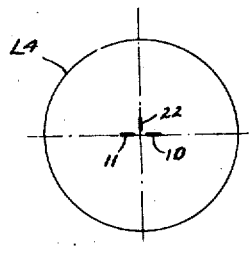
Fig 4
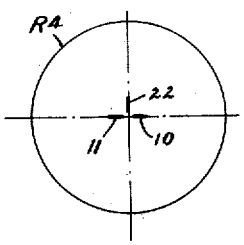
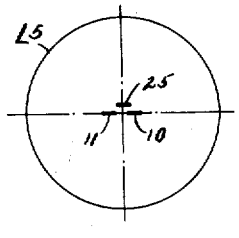
Fig 5
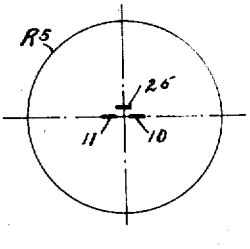
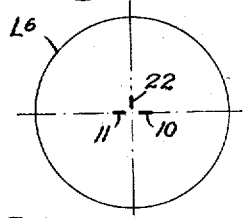
Fig 6
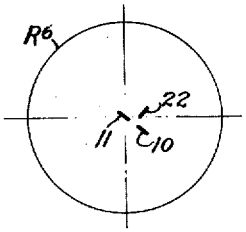
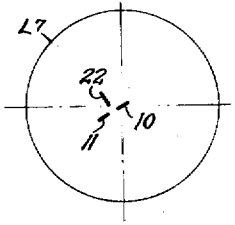
Fig 7
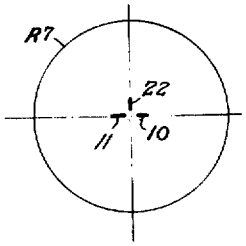
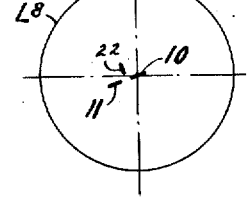
Fig 8
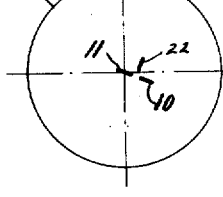
INVENTOR
VAL J. ROPER
BY Charles E. Mullen
HIS ATTORNEY Feb. 7, 1939.  V. J. ROPER  2,146,593
VEHICLE HEAD LAMP
Filed Nov. 18, 1931  4 Sheets-Sheet 2
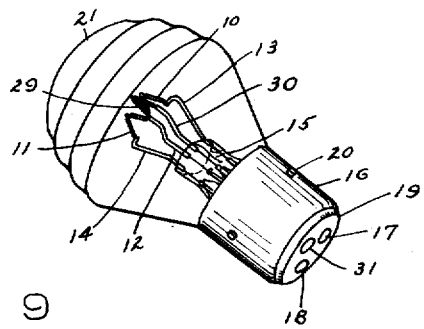
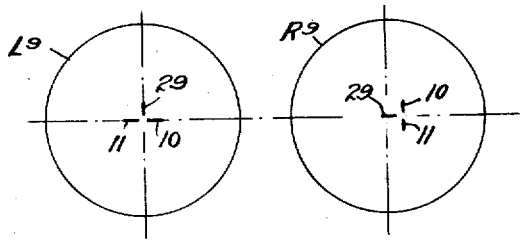
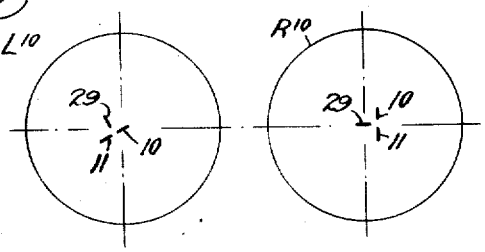
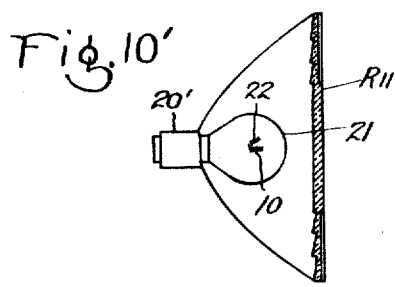
INVENTOR
VAL J. ROPER
BY Charles E. Tullar
HIS ATTORNEY Feb. 7, 1939.  V. J. ROPER  2,146,593
VEHICLE HEAD LAMP
Filed Nov. 18, 1931  4 Sheets—Sheet 3
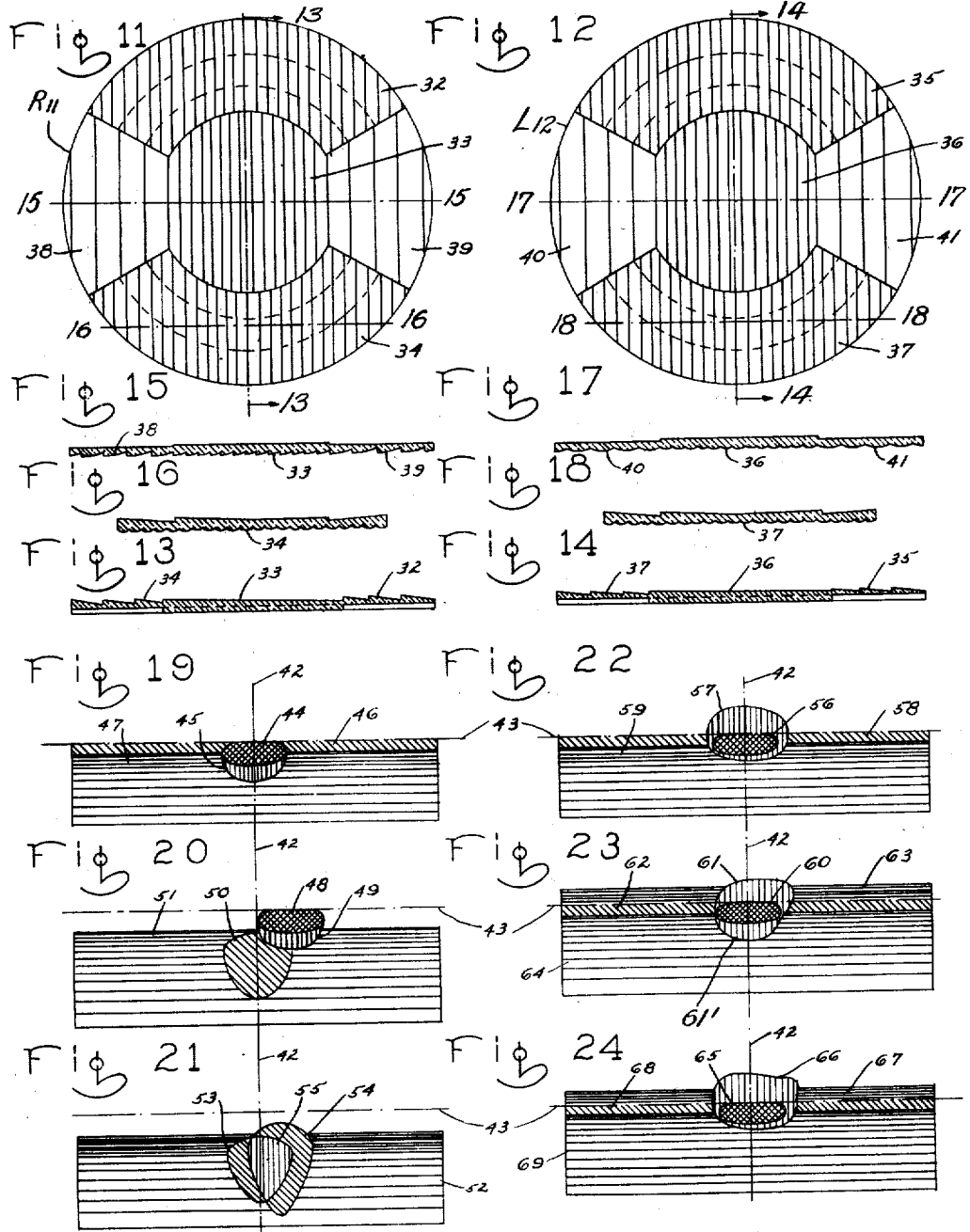
INVENTOR
VAL J. ROPER
BY Charles E. Mullen
HIS ATTORNEY Feb. 7, 1939.   V. J. ROPER   2,146,593
VEHICLE HEAD LAMP
Filed Nov. 18, 1931   4 Sheets—Sheet 4
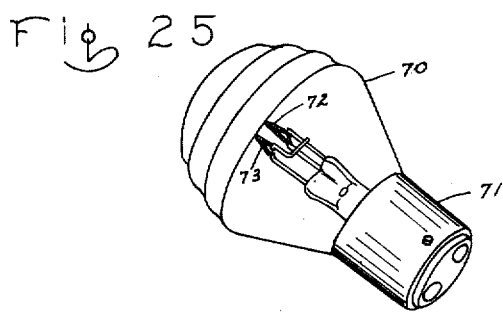
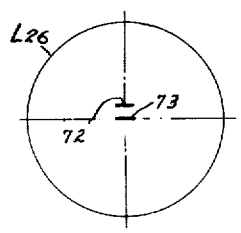 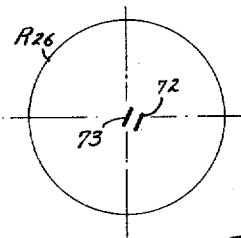 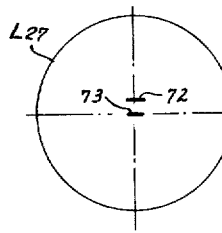 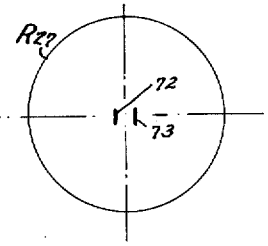
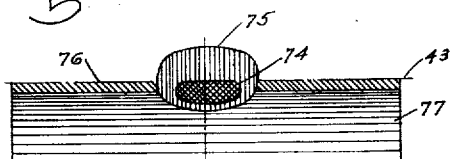 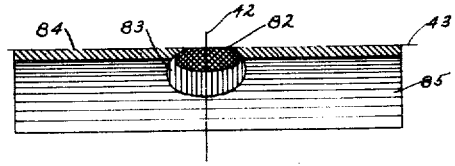
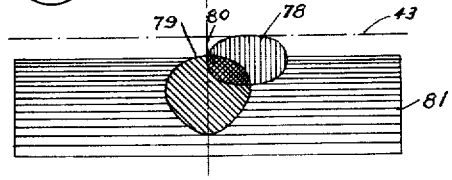
INVENTOR
VAL J. ROPER
BY Charles V. Tulla
HIS ATTORNEY Patented Feb. 7, 1939

2,146,593

UNITED STATES PATENT OFFICE 2,146,593

VEHICLE HEAD LAMP

Val J. Roper, Cleveland, Ohio, assignor to General Electric Company, a corporation of New York Application November 18, 1931, Serial No. 575,859

12 Claims. (Cl. 240—41.35)

My invention relates to vehicle headlamps and more particularly to combinations of light sources, lenses, and reflectors which will produce a desired illumination. One of the objects of my invention is to provide such a combination which will produce an asymmetric beam providing illumination along the right side of the road for approaching another vehicle, free from glare in the direction of the driver of said vehicle, but providing enough illumination to reveal the boundaries of the road as well as pedestrians or obstacles on the road itself, and from the same equipment a main driving beam for the open road which is substantially symmetric laterally. Another object of my invention is to combine with the above an arrangement for adding to the driving beam, if desired, a certain amount of light above the horizontal to provide vision for a greater distance when approaching up grades either from the level or a dip and to take care of deflections which arise from the bouncing of the car at the higher speeds. Still another object of my invention is to provide in addition to the two above-mentioned beams another beam from the same equipment in which substantially all light is directed below the horizontal. These objects are accomplished by filament arrangements which, in combination with light directing elements, permit an optical shift of the beam laterally as well as vertically by switching between filaments. Other features and advantages of my invention will appear from the following description of species thereof and from the accompanying drawings.

In the drawings Fig. 1 is a perspective view of a lamp forming part of my invention; Figs. 2 and 3 are similar views of modifications thereof; Figs. 4 to 10 inclusive are diagrammatic views showing the locations of the light sources in the reflectors as seen through the reflector from the driver's seat; Fig. 10' is a diagrammatic side view of a complete headlamp; Fig. 11 is a front view of the right headlamp lens; Fig. 12 is a similar view of the left headlamp lens; Fig. 13 is a vertical section along line 13—13 of Fig. 11; Fig. 14 is a similar section along line 14—14 of Fig. 12; Figs. 15 and 16 are horizontal sections along lines 15—15 and 16—16 respectively of Fig. 11; Figs. 17 and 18 are similar sections along lines 17—17 and 18—18 respectively of Fig. 12; Fig. 19 is a diagrammatic illustration of the driving beam pattern produced by the arrangement in either Fig. 4 or 5; Figs. 20 and 21 are similar views of the passing and city beam patterns respectively and are produced by all of the arrangements illustrated in Figs. 4 to 10 inclusive; Figs. 22, 23 and 24 are views of driving beam patterns resulting from the arrangements shown in Figs. 6 or 9, 7, and 8 or 10 respectively; Fig. 25 is a perspective view of another lamp comprising my invention; Figs. 26 and 27 are diagrammatic views showing the locations of the filaments of Fig. 25 in the reflectors; Figs. 28 and 29 are views of the driving and passing beam patterns produced by the arrangement shown in Fig. 26; and Fig. 30 is a similar view of a driving beam pattern produced by the arrangement shown in Fig. 27.

Referring to Figs. 1, 2 and 3, the lamps comprise in common two V filaments 10 and 11 which are disposed side by side in a plane passing through the axis of the lamp. The adjacent ends of the filaments are attached to a common lead wire 12 which, together with leads 13 and 14, which are attached to the opposite ends of the filaments 10 and 11 respectively, pass through a stem 15 and are attached to portions of the base. The common lead 12 is attached to a metallic shell 16 of the base, and leads 13 and 14 are attached to contacts 17 and 18 respectively which are embedded in an insulating block 19 in the base. The shell 16 is provided with pins 20 which serve to locate the base in the socket 20' (Fig. 10') of the headlamp, and the filaments are enclosed within a rippled bulb 21, such as disclosed in Patent 1,621,360, Falge. Referring to Fig. 1, a third filament 22 extends from the end of the common lead 12 to the lead 23 at an angle substantially 45° to the plane of filaments 10 and 11. The lead 23 passes through the stem 15 to a contact 24 of the base. A third filament 25 in the lamp shown in Fig. 2 is V-shaped and is mounted directly above the other filaments in a plane parallel thereto. One end of said filament is attached to a support wire 26 which is in turn attached to the common lead 12 while the other end of said filament is attached to the lead 27 which is attached to a contact 28 of the base. The lamp shown in Fig. 3 is also equipped with a third filament 29 which is also V-shaped but is mounted in a plane perpendicular to the plane of the other filaments. One end of said filament is attached to the end of the common lead 12 of this lamp and the other end to the lead 30 which passes through the stem to the contact 31 of the base.

These lamps (Figs. 1, 2 and 3) may be used interchangeably in various set-ups with good results but will produce particularly desirable results when used in the ways diagrammatically illustrated in Figs. 4 to 10 inclusive. These figures represent views of a pair of reflectors looking from the driver's seat of the vehicle and illustrate diagrammatically the position of the filaments. In each case the lens shown in Fig. 11 must be placed in front of the right reflector, and the lens shown in Fig. 12 in front of the left reflector to produce the light beams as they are illustrated. The terms right and left designate the headlamps as viewed from the driver's seat. These lenses differ only in the direction and amount of their horizontal light spreading capabilities. Areas 32, 33, 34, and 35, 36, 37, as shown in Figs. 13 and 14, are covered with prisms which bend the light down, and areas 38, 39, and 40, 41 have no downward bending prisms. The prisms in areas 32, 34, and 35, 37 are preferably progressive in design while the prism or prisms in areas 33 and 36 need not be progressive because their bending action is slight. These prisms direct the light in substantially only the vertical direction and may be incorporated in one face of the lens, as shown, or in the so-called horizontal spreading flutes on the other surface thereof.

The spreading flutes in the right lens R11 (Figs. 11, 15 and 16) comprise half flutes with a spreading action of about 6° which are disposed over areas 38, 39 and 33 and which throw the light to the right from the driver's seat, and full flutes with a spreading action of about 20° which are disposed over areas 32 and 34. Areas 38, 39 and 33 may comprise sideward bending prisms instead of half flutes, or sideward bending prisms in combination with half flutes. The left lens L12 (Figs. 12, 17 and 18) has full flutes with a spreading action of preferably 6° to 8° which are disposed over areas 40 and 41, and full flutes with a spreading action of 30° to 40° which are disposed over areas 35, 36 and 37. Other methods of dividing the lens area into sections can very easily be devised, and other lens designs for use with reflectors having both the spreading and/or bending characteristics can be used, so I do not wish to limit myself strictly to this design. I am also aware that the lenses can be placed in the opposite reflectors without changing the beam pattern if the filaments are arranged accordingly. The headlamps used in my invention comprise a pair of parabolic or modified parabolic reflectors in which are used any of the incandescent lamps shown in Figs. 1, 2, 3 and 25.

One position of the filaments within the reflector which gives satisfactory light beams with the lamp shown in Fig. 1 is illustrated in Fig. 4. With this arrangement all the filaments are at a compromise focus, that is, all filaments are substantially equidistant from the focal point of the reflector. In this disclosure and the appended claims, the focal point of the modified reflector is considered as the point at which a filament used in combination with a suitable lens produces the same results as a filament at the focal point of a parabolic reflector. By a modified reflector I mean a parabolic reflector modified by changing the contour of portions thereof so as to deflect light downwardly and/or spread the light laterally, to perform the function of the usual prismatic and fluted lenses placed in front of the common unmodified parabolic reflector. Three patterns resulting from this arrangement, which I have found to be particularly desirable, are shown in Figs. 19, 20 and 21. The beam patterns are shown as they appear from the driver's seat when thrown upon a screen. The various areas represented are not necessarily of a given intensity or of even intensity, as hereinafter explained. The first pattern shown in Fig. 19 represents what might be called a driving beam and is produced by using filaments 10 and/or 11 in the headlamp using the lens shown in Fig. 12, which in this case is the left headlamp L4, and filament 10 in the other headlamp R4 (Fig. 4). The beam pattern produced is characterized by a so-called "hot spot" 44 of substantially oval cross-section, located at the center (line 42) and just below horizontal (line 43), a smaller area 45 of less intensity directly below the first, a narrow band 46 of still less intensity just below horizontal extending to the limits of the beam, and another band of light 47 just below the band 46, running the full width of the beam and decreasing in strength below the horizontal. The hot spot 44 is produced by lens areas 40—41 of Fig. 12 with filaments 10 and/or 11. The pattern area 45 is produced by lens areas 33—38—39 of Fig. 11 with filament 10. The band 46 is produced by lens area 36 of Fig. 12 with filaments 10 and/or 11. The band 47 is produced by lens areas 32—34 of Fig. 11 with filament 10 and lens areas 35—37 of Fig. 12 with filaments 10 and/or 11. The pattern shown in Fig. 20 may be referred to as a passing beam since some of the light is thrown to the right of center and the rest is depressed below the horizontal (line 43). Essentially this beam pattern is obtained by any of the set-ups shown in Figs. 4 to 10. The characteristics of this beam are a "hot spot" 48 of substantially oval cross-section located to the right of center and just below the horizontal, a smaller area 49 of less intensity below the area 48, a shield-shaped area 50 of still less intensity directly in the center and a few degrees below horizontal, and another band 51 running the full width of the beam and decreasing in strength below the horizontal. This beam is produced by operating filament 11 in the right headlamp R4 (Fig. 4) and filament 22 in the left headlamp L4. The hot spots 48—49 are produced by lens areas 33—38—39 of Fig. 11 with filament 11. The pattern area 50 is produced by lens areas 40—41 of Fig. 12 with filament 22. The band 51 is produced by lens areas 35—36—37 of Fig. 12 with filament 22 and lens areas 32—34 of Fig. 11 with filament 11.

The third pattern of the combination which may be used during city driving is shown in Fig. 21 and is produced by the use of filaments 22 in each headlamp. The light in this case consists of a large band 52 which covers the full width of the beam and is several degrees below horizontal, and a shield-shaped area 53 and an apioidal area 54 of approximately equal intensity. Since the area 53 is on center and just below horizontal, and the area 54 is just to the right of center and below horizontal, they overlap to form a third area, 55, of greater intensity. The pattern area 53 is produced by lens areas 40—41 of Fig. 12 with filament 22. The area 54 is produced by lens areas 33—38—39 of Fig. 11 with filament 22. The band 52 is produced by lens areas 35—36—37 of Fig. 12 with filament 22 and lens areas 32—34 of Fig. 11 with filament 22. This beam pattern represents substantially the city beams of all the arrangements shown in Figs. 4 to 10.

A somewhat similar arrangement appears in Fig. 5 which illustrates the arrangement using the lamp of Fig. 2. In this lamp the third filament 22 of Fig. 1 is replaced by a filament 25 of different design which does not alter the beam design appreciably. It will therefore be noted that this lamp may be substituted for the other in each of the arrangements in Figs. 4 to 10 with good results, providing filaments 10 and 11 are in the same position in each instance. In actual practice this lamp is perhaps to be preferred although due to lower manufacturing costs, the former lamp may be considered more important.

Another arrangement of the filaments that gives very desirable characteristics is shown in Fig. 6. In this arrangement the lamp in the right headlamp R6 is so placed that filament 11 is in the focal point of the reflector, and filament 10 is to the right and below the focal point. With this set-up the passing and city beams are substantially the same as before, but the driving beam pattern is like that shown in Fig. 22. The characteristics of this beam are a "hot spot" 56 of substantially oval cross-section, located at the center and just below horizontal, another larger and roughly oval "hot spot" 57 of less intensity substantially in the center and above and below horizontal, a narrow band 58 of still less intensity just below horizontal running the full width of the beam, and another band 59 also running the full width of the beam and decreasing in strength below the horizontal. The hot spot 56 is produced by lens areas 40—41 of Fig. 12 with filaments 10 and/or 11. The second hot spot 57 is produced by lens areas 33—38—39 of Fig. 11 with filament 10. The band 58 is produced by lens area 36 of Fig. 12 with filaments 10 and/or 11. The band 59 is produced by lens areas 35—37 of Fig. 12 with filaments 10 and/or 11 and lens areas 32—34 of Fig. 11 with filament 10.

Perhaps the most preferable arrangement is that shown in Fig. 7. The left headlamp L7 has filament 10 at the focal point of the reflector, and filament 11 to the left and below the focal point. The lamps may be identical, that in the left unit being rotated to provide the position indicated in Fig. 7. The right headlamp R7 has filaments 10 and 11 in a horizontal plane and equidistant from the focal point. With this arrangement four beams may be produced. First, a driving beam shown in Fig. 23, is obtained by using filaments 10 and 11 (Fig. 7) in the left headlamp L7, and filament 10 in the right headlamp R7. Then, a passing beam substantially as shown in Fig. 20 is obtained by using filament 22 in the left headlamp and filament 11 in the right headlamp, and a city beam, which is of substantially the pattern shown in Fig. 21, is obtained by the use of filament 22 in each lamp. Still another beam, chiefly used for focusing and aiming the headlamps, uses filament 10 in each headlamp giving substantially the pattern shown in Fig. 23 with areas 61 and 63 removed. This latter beam may also be used as a driving beam in suburban districts and also as a driving beam in the country when no light above the horizontal is needed or desired. The driving beam pattern (Fig. 23) is characterized by a "hot spot" 60 of substantially oval cross-section located at the center and just below horizontal, another "hot spot" 61 of less intensity extending above and below horizontal, a third hot spot 61' below horizontal, a narrow band 62 of still less intensity just below horizontal and running the full width of the beam, a narrow band 63 above horizontal and also running the full width of the beam, and a wide band 64 also running the full width of the beam and decreasing in strength below the horizontal. The hot spot 60 is produced by lens areas 40—41 of Fig. 12 with filament 10. The second hot spot 61 is produced by lens areas 40—41 of Fig. 12 with filament 11. The third hot spot 61' is produced by lens areas 33—38—39 of Fig. 11 with filament 10. The band 62 is produced by lens area 36 of Fig. 12 with filament 10 and the band 63 is produced by the same lens area with filament 11. The band 64 is produced by lens areas 35—37 of Fig. 12 with filaments 10—11 and lens areas 32—34 of Fig. 11 with filament 10.

By slanting the lamps in both headlamps, as shown in Fig. 8, another arrangement is obtained which provides passing and city beam patterns substantially the same as in the first case, but a driving beam pattern as shown in Fig. 24. Said pattern of Fig. 24 is characterized by "hot spot" 65 of substantially oval cross-section just below horizontal and at the center, a larger "hot spot" 66 of less intensity above and below horizontal and substantially at the center, a narrow band 67 of less intensity above horizontal running the full width of the beam, a narrow band 68 just below horizontal of slightly more intensity than the band 67 but of less intensity than either of the hot spots, running the full width of the beam, and another band 69 the full width of the beam, having an intensity at the top approximately that of the band 67 and decreasing in strength below the horizontal. The hot spot 65 is produced by lens areas 40—41 of Fig. 12 with filament 10. The second hot spot 66 is produced by lens areas 40—41 of Fig. 12 with filament 11 and lens areas 33—38—39 of Fig. 11 with filament 10. The band 67 is produced by areas 36 of Fig. 12 with filament 11, and the band 68 is produced by the same lens area with filament 10. The band 69 is produced by lens areas 35—37 of Fig. 12 with filaments 10 and 11 and lens areas 32—34 of Fig. 11 with filament 10.

The arrangements shown in Figs. 9 and 10 are particularly adapted for the lamp shown in Fig. 3. The arrangement shown in Fig. 9 gives essentially the driving beam shown in Fig. 22 when using filaments 10 and/or 11 in the left headlamp L9 and filament 11 in the right headlamp R9. Fig. 10 gives essentially the driving beam shown in Fig. 24 by using filaments 10 and 11 in the left headlamp L10 and filament 11 in the right headlamp R10. It also gives essentially a driving beam of the form shown in Fig. 22 when using filament 10 in the left headlamp and filament 11 in the right headlamp. The passing beam of each arrangement is substantially the same as that shown in Fig. 20 and is obtained by the use of filaments 29 in each headlamp. The city beam is substantially the same in each instance and is essentially that shown in Fig. 21 and is produced by the use of filament 29 in the left headlamp and filament 10 in the right headlamp.

In Fig. 25 is shown a standard two-filament lamp comprising a bulb 70 and base 71. Two V-shaped filaments 72, 73 are located in parallel planes, which are in turn parallel to the axis of the lamp. With the lamps oriented so as to place the filaments in the positions shown in Fig. 26, beam patterns such as shown in Figs. 28 and 29 are obtained with the use of the lenses shown in Figs. 11 and 12. To produce the pattern shown in Fig. 28, which is a driving beam, filament 73 of the left lamp L26, which filament is at the focal point of the reflector, and filament 72 of the right lamp R26, which is to the right and below the focal point of the reflector, are used. Said pattern is characterized by a "hot spot" 74 of substantially oval cross-section located at the center and just below horizontal, a substantially oval-shaped area 75 of less intensity, above and below horizontal, an area 76 just below horizontal running the full width of the beam, and an area 77 of least intensity which runs the full width of the beam and decreases in intensity below the horizontal. The hot spot 74 is produced by lens areas 40—41 of Fig. 12 with filament 73. The second hot spot 75 is produced by lens areas 33—38—39 of Fig. 11 with filament 72. The band 76 is produced by lens area 36 of Fig. 12 with filament 73. The band 77 is produced by lens areas 35—37 of Fig. 12 with filament 73 and lens areas 32—34 of Fig. 11 with filament 72. To produce the passing beam pattern of Fig. 29, filament 72, of the left lamp L26, which is above the focal point of the reflector, and filament 73 of the right lamp R26, which is at the focal point of the reflector, are used. Said pattern is characterized by an oval-shaped area 78 of high intensity located to the right of center and just below horizontal, and a shield-shaped area 79 of lesser intensity at the center and several degrees below horizontal. Said areas 78, 79 merge at a portion 80 which is of greater intensity and lies to the right of center. Another band 81, of lower intensity, runs the full width of the beam and decreases in intensity below the horizontal. The pattern area 78 is produced by lens areas 33—38—39 of Fig. 11 with filament 73. Pattern area 79 is produced by lens areas 40—41 of Fig. 12 with filament 72. The band 81 is produced by lens areas 35—36—37 of Fig. 12 with filament 72 and lens areas 32—34 of Fig. 11 with filament 73.

With the lamp of Fig. 25, in the positions shown in Fig. 27, beam patterns such as shown in Figs. 30 and 29 are produced. To produce the driving beam pattern of Fig. 30, filament 73 of the left lamp L27 which is at the focal point of the reflector, and filament 73 of the right lamp R27 which is to the right of the focal point of the reflector, are used. Said beam pattern is characterized by a "hot spot" 82 of substantially oval cross-section located at the center and just below the horizontal and a substantially oval-shaped area 83 of lesser intensity which is also at the center and just below area 82. A band 84 runs the full width of the beam just below horizontal and another band 85 also runs the full width of the beam and decreases in intensity below the beam 84. The hot spot 82 is produced by lens areas 40—41 of Fig. 12 with filament 73. Pattern area 83 is produced by lens areas 33—38—39 of Fig. 11 with filament 73. The band 84 is produced by lens area 36 of Fig. 12 with filament 73. The band 85 is produced by lens areas 35—37 of Fig. 12 with filament 73, and lens areas 32—34 of Fig. 11 with filament 73. The combination of filament 72 in the right lamp (Fig. 27) and filament 72 of the left lamp, produces substantially the pattern shown in Fig. 29, hereinbefore explained.

It should be realized that only the preferred arrangements and beams are illustrated, and that I am aware that many more of each could be made by altering the reflector or lens, the positions of the lamps and/or filament shapes. I do not wish to limit myself to the particular shape of the lens as other lenses divided differently and with more or less spreading or bending areas may be used in combination with a parabolic reflector or a reflector of modified contour.

What I claim as new and desire to secure by Letters Patent of the United States is:

1. The combination of two vehicle headlamps, one disposed to the right viewed from a driver's position and the other to the left, one of said headlamps comprising a reflector having a focal point and an electric lamp having three light sources disposed respectively to the left, to the right, and above said focal point, and the other of said headlamps comprising a reflector having a focal point, an electric lamp having three light sources disposed respectively at the focal point, to one side and below, and to one side and above the focal point.

2. The combination of two vehicle headlamps, one disposed to the right viewed from a driver's position and the other to the left, one of said headlamps comprising a reflector having a focal point and an electric lamp having three light sources disposed respectively to the left, to the right, and above said focal point, said headlamp having vertically extending symmetrical flutes therein, and the other of said headlamps comprising a reflector having a focal point, an electric lamp having three light sources disposed respectively at the focal point, to one side and below, and to one side and above the focal point, said headlamp having vertically extending unsymmetrical flutes across the middle thereof arranged to spread light to the right and vertically extending symmetrical flutes at the top and bottom thereof.

3. The combination of two vehicle headlamps, one disposed to the right viewed from a driver's position and the other to the left, the left headlamp comprising a reflector having a focal point and an electric lamp having three light sources disposed respectively to the left, to the right, and above said focal point, and the right headlamp comprising a reflector having a focal point, an electric lamp having three light sources disposed respectively at the focal point, to the right and below, and to the right and above the focal point and light directing elements adapted to direct light to the right.

4. The combination of two vehicle headlamps, one disposed to the right viewed from a driver's position and the other to the left, one of said headlamps comprising a reflector having a focal point and an electric lamp having three light sources disposed respectively to the left, to the right, and above said focal point and light directing elements adapted to direct light to one side, and the other of said headlamps comprising a reflector having a focal point, an electric lamp having three light sources disposed respectively at the focal point, to one side and below, and to one side and above the focal point.

5. The combination of two vehicle headlamps, one disposed to the right viewed from a driver's position and the other to the left, the left headlamp comprising a reflector having a focal point, and an electric lamp having three light sources disposed respectively at the focal point, to the left and below, and to the left and above the focal point, and the right headlamp comprising a reflector having a focal point, and an electric lamp having three light sources disposed respectively to the left, to the right and above the focal point.

6. The combination of two vehicle headlamps, one disposed to the right viewed from a driver's position and the other to the left, the left headlamp comprising a reflector having a focal point, and an electric lamp having three light sources disposed respectively at the focal point, to the left and below, and to the left and above the focal point, said headlamp having vertically extending symmetrical flutes therein; and the right headlamp comprising a reflector having a focal point, and an electric lamp having three light sources disposed respectively to the left, to the right and above the focal point, said headlamp having vertically extending unsymmetrical flutes across the middle thereof arranged to spread light to the right and vertically extending symmetrical flutes at the top and bottom thereof.

7. The combination of two vehicle headlamps one disposed to the right viewed from the driver's position and the other to the left and each comprising light projecting means including a concave light-concentrating reflector and a glass closure, one of said headlamps comprising an electric lamp having two concentrated light sources disposed side by side, and the light projecting means of said headlamp comprising vertically extending unsymmetrical flutes arranged to spread light toward the right, whereby when the right hand light source is energized the light beam is substantially symmetrical but when the left hand light source is energized the beam is asymmetrical to the right, the other headlamp comprising an electric lamp having an upper and a lower light source therein and the light projecting means of said headlamp having vertically extending symmetrical flutes whereby when either of said light sources is energized the beam is substantially symmetrical but the beam from the upper light source is depressed below the top of the beam produced by the lower light source.

8. The combination of two vehicle headlamps one disposed to the right viewed from the driver's position and the other to the left and each comprising light projecting means including a concave light-concentrating reflector and a glass closure, one of said headlamps comprising an electric lamp having two concentrated light sources disposed side by saide, one on each side of the focal point of said reflector, and the light projecting means of said headlamp comprising vertically extending unsymmetrical flutes arranged to spread light toward the right, whereby when the right hand light source is energized the light beam is substantially symmetrical but when the left hand light source is energized the beam is asymmetrical to the right, the other headlamp comprising an electric lamp having an upper and a lower light source therein and the light projecting means of said headlamp having vertically extending symmetrical flutes whereby when either of said light sources is energized the beam is substantially symmetrical but the beam from the upper light source is depressed below the top of the beam produced by the lower light source.

9. The combination of two vehicle headlamps one disposed to the right viewed from the driver's position and the other to the left and each comprising light projecting means including a concave light-concentrating reflector and a glass closure, one of said headlamps comprising an electric lamp having two concentrated light sources disposed side by side, and a third light source disposed above said pair of light sources, and the light projecting means of said headlamp comprising vertically extending unsymmetrical flutes arranged to spread light toward the right, whereby when the right hand light source is energized the light beam is substantially symmetrical but when the left hand light source is energized the beam is asymmetrical to the right and when the upper light source is energized the beam is depressed below the tops of the beams produced by the other two light sources; the other headlamp comprising an electric lamp having an upper and a lower light source therein and the light projecting means of said headlamp having vertically extending symmetrical flutes whereby when either of said light sources is energized the beam is substantially symmetrical but the beam from the upper light source is depressed below the top of the beam produced by the lower light source.

10. The combination of two vehicle headlamps one disposed to the right viewed from the driver's position and the other to the left and each comprising light projecting means including a concave light-contrating reflector and a glass closure, one of said headlamps comprising an electric lamp having two concentrated light sources disposed side by side, and the light projecting means of said headlamp comprising vertically extending unsymmetrical flutes of narrow lateral light spread across the middle thereof and arranged to spread light toward the right, and vertically extending symmetrical flutes of wide lateral light spread located at the top and bottom thereof, whereby when the right hand light source is energized the light beam is substantially symmetrical but when the left hand light source is energized the high intensity portion projected from the unsymmetrical flutes across the middle of said headlamp is sharply shifted to the right while the portion of the beam projected from the top and bottom symmetrical flutes is substantially unaffected by the switch between light sources so that the beam is asymmetrical to the right, the other headlamp comprising an electric lamp having an upper and a lower light source therein and the light projecting means of said headlamp having vertically extending symmetrical flutes whereby when either of said light sources is energized the beam is substantially symmetrical but the beam from the upper light source is depressed below the top of the beam produced by the lower light source.

11. The combination of two vehicle headlamps one disposed to the right viewed from the driver's position and the other to the left and each comprising light projecting means including a concave light-concentrating reflector and a glass closure, one of said headlamps comprising an electric lamp having two concentrated light sources disposed side by side, and a third light source disposed above said pair of light sources, and the light projecting means of said headlamp comprising vertically extending unsymmetrical flutes of narrow lateral light spread across the middle thereof arranged to spread light toward the right, and vertically extending symmetrical flutes of wide lateral light spread located at the top and bottom thereof, whereby when the right hand source is energized the light beam is substantially symmetrical but when the left hand light source is energized the high intensity portion projected from the unsymmetrical flutes across the middle of said headlamp is sharply shifted to the right while the portion of the beam projected from the top and bottom symmetrical flutes is substantially unaffected by the switch between light sources so that the beam is asymmetrical to the right, and when the upper light source is energized the beam is depressed below the tops of the beams produced by the other two light sources; the other headlamp comprising an electric lamp having an upper and a lower light source therein and the light projecting means of said headlamp having vertically extending symmetrical flutes whereby when either of said light sources is energized the beam is substantially symmetrical but the beam from the upper light source is depressed below the top of the beam produced by the lower light source.

12. A pair of headlamps adapted to be mounted at the front of a vehicle and to light the roadway, one of said headlamps comprising light projecting means including a concave light-concentrating reflector and a glass closure, means providing a source of light adjacent the focal region of the reflector or at a point above the focal region, said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, the other headlamp comprising light projecting means including a concave light-concentrating reflector and a glass closure, means providing laterally spaced sources of light adjacent the focus, whereby upon changing from the source at the right to the source at the left the top of the beam is shifted to the right; means for simultaneously energizing the lower source of the first-named lamp together with the right-hand source of the second-named lamp to produce a combined beam having its maximum intensity substantially down the center of the road, and means for simultaneously energizing the upper source of the first-named lamp and the left-hand source of the second-named lamp to produce a combined beam higher on the right than on the left for passing.

VAL J. ROPER.

CERTIFICATE OF CORRECTION.

Patent No. 2,146,593. February 7, 1939.

VAL J. ROPER.

It is hereby certified that error appears in the printed specification of the above numbered patent requiring correction as follows: Page 3, first column, line 66, for "extendng" read extending; and second column, line 34, for the word "areas" read area; page 4, second column, line 23, claim 2, after "therein" strike out the comma and insert instead a semicolon; page 5, first column, line 44, claim 8, for "saide" read side; and second column, line 19, claim 10, for "light-contrating" read light-concentrating; and that the said Letters Patent should be read with this correction therein that the same may conform to the record of the case in the Patent Office.

Signed and sealed this 11th day of April, A. D. 1939.

Henry Van Arsdale (Seal)

Acting Commissioner of Patents.

light sources; the other headlamp comprising an electric lamp having an upper and a lower light source therein and the light projecting means of said headlamp having vertically extending symmetrical flutes whereby when either of said light sources is energized the beam is substantially symmetrical but the beam from the upper light source is depressed below the top of the beam produced by the lower light source.

12. A pair of headlamps adapted to be mounted at the front of a vehicle and to light the roadway, one of said headlamps comprising light projecting means including a concave light-concentrating reflector and a glass closure, means providing a source of light adjacent the focal region of the reflector or at a point above the focal region, said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, the other headlamp comprising light projecting means including a concave light-concentrating reflector and a glass closure, means providing laterally spaced sources of light adjacent the focus, whereby upon changing from the source at the right to the source at the left the top of the beam is shifted to the right; means for simultaneously energizing the lower source of the first-named lamp together with the right-hand source of the second-named lamp to produce a combined beam having its maximum intensity substantially down the center of the road, and means for simultaneously energizing the upper source of the first-named lamp and the left-hand source of the second-named lamp to produce a combined beam higher on the right than on the left for passing.

VAL J. ROPER.

CERTIFICATE OF CORRECTION.

Patent No. 2,146,593. February 7, 1939.

VAL J. ROPER.

It is hereby certified that error appears in the printed specification of the above numbered patent requiring correction as follows: Page 3, first column, line 66, for "extendng" read extending; and second column, line 34, for the word "areas" read area; page 4, second column, line 23, claim 2, after "therein" strike out the comma and insert instead a semicolon; page 5, first column, line 44, claim 8, for "saide" read side; and second column, line 19, claim 10, for "light-contrating" read light-concentrating; and that the said Letters Patent should be read with this correction therein that the same may conform to the record of the case in the Patent Office.

Signed and sealed this 11th day of April, A. D. 1939.

Henry Van Arsdale (Seal)

Acting Commissioner of Patents.